July 26, 1932. W. R. COPPAGE 1,869,050
CONVEYER CHAIN
Filed April 6, 1932
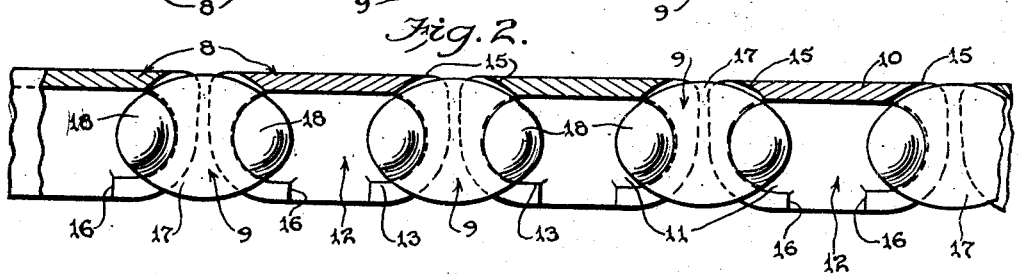
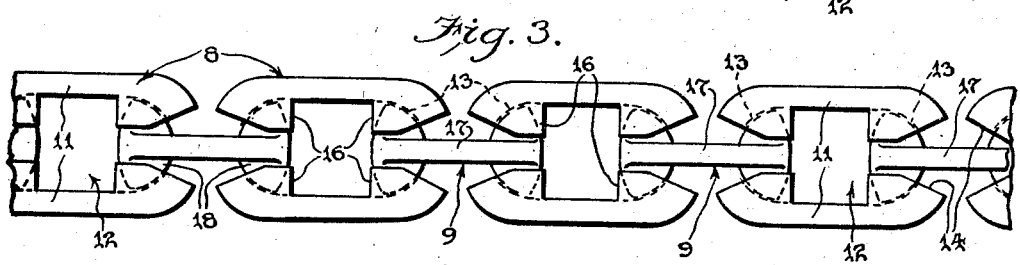
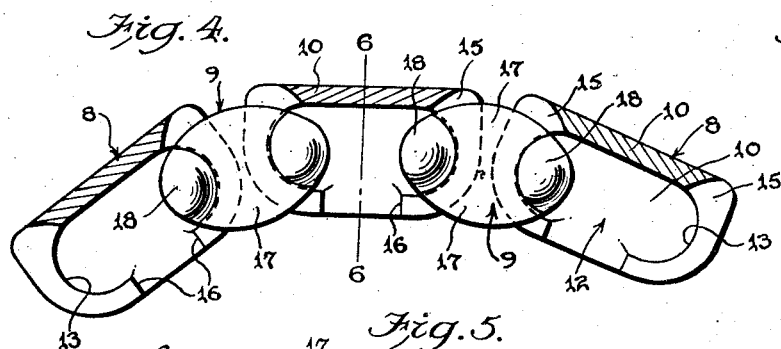
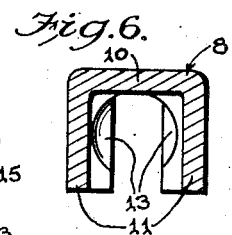
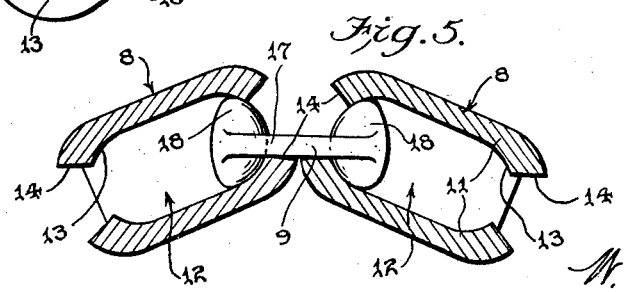
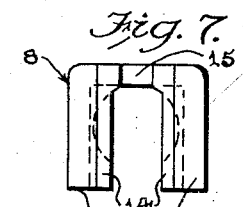
Inventor
W. R. Coppage
By Seymour & Bright
Attorneys Patented July 26, 1932

1,869,050

UNITED STATES PATENT OFFICE

WILLIAM R. COPPAGE, OF CHERRYDALE, VIRGINIA

CONVEYER CHAIN

Application filed April 6, 1932. Serial No. 603,626.

This invention relates to improvements in conveyer chains of the type disclosed in my application Serial No. 524,699, filed March 23, 1931, now Patent No. 1,857,529.

In said application, I have disclosed a conveyer chain having readily detachable and interchangeable links, alternate ones having substantially plane surfaces so that a box or the like may be carried by the chain to a predetermined station, and then, be halted by some obstructing means without interfering with the continuous travel of the chain.

Such a construction is especially advantageous in handling milk bottle boxes within a dairy, for a box placed on the conveyer can be carried automatically to a desired station by the chain conveyer, and may then remain on the conveyer in an immovable position while the chain or chains continue to travel beneath the box.

One of the objects of the present invention is to provide such a chain in which each intermediate link consists of a substantially flat and substantially oval-shaped web provided at its ends with parti-spherical balls adapted to interchangeably engage complimentary pockets in alternate channel-shaped links of the chain.

Another object is to provide such a chain in which the intermediate links are so shaped as to bridge the spaces between the channel-shaped links and insure the continuity of the flat surface formed by the channel-shaped links, so as to prevent portions of boxes or the like falling into the spaces between the channel-shaped links and interfering with the movement of the chain or breaking the box.

A further object is to provide such a chain in which the links are connected for limited universal movement, but in which no link can make a complete revolution lengthwise of the chain.

With the foregoing objects outlined and with other objects in view which will appear as the description proceeds, the invention consists in the novel features hereinafter described in detail, illustrated in the accompanying drawing, and more particularly pointed out in the appended claims.

In the drawing,

Fig. 1 is a side elevation of a portion of a chain made in accordance with the invention.

Fig. 2 is a longitudinal vertical sectional view of the same.

Fig. 3 is a bottom plan view of such portion of the chain.

Fig. 4 is a view similar to Fig. 2, but illustrating the manner in which the chain can flex in passing around a sprocket wheel.

Fig. 5 is a horizontal sectional view of a few of the links, and illustrating the manner in which the chain may pass around a corner or the like.

Fig. 6 is a sectional view of one of the channel-shaped links, taken on the line 6—6 of Fig. 4.

Fig. 7 is an end view of one of the channel-shaped links.

Referring to the drawing, it will be noted that the chain is made up of alternate channel-shaped links 8, and substantially "dumbbell"-shaped intermediate links 9.

Each link 8 consists of a flat plate 10 from which extends a pair of walls 11 to form a channel 12 having parti-spherical pockets 13 at their ends. As best shown in Fig. 3, the ends of the walls are cut away to form flaring mouths 14, and the ends of the plate 10 are also cut away to form recesses 15 which communicate with the mouths. The walls 11 also form shoulders 16 at the mouth of the channel, and these shoulders are adapted to be engaged by the teeth of the sprocket wheels, not shown, of the conveyer.

Each of the intermediate links preferably consists of a flat oval-shaped web 17 having parti-spherical balls 18 at its ends. The balls, in assembling the chain, are adapted to enter the mouths of the channels 12 between the shoulders 16, and then move into the pockets 13, in a manner which will be clear from the drawing. Owing to the oval shape of the web 17, it will be recognized that each intermediate link may be assembled in the chain with either edge of the web upwardly, and regardless of which edge is up, the web will bridge the space between the ends of adjacent channel-shaped links so that the top surface 19 of the chain (Fig. 1), will be substantially flat and unbroken. Obviously, when a pair or more of such chains are arranged parallel in a conveyer, flat runs of the chains will form a substantially plane support over which boxes may be slid, or the chains may travel beneath the boxes, while the latter rest on the chain, providing, of course, the boxes are prevented from moving. Of course, when it is desired, and the obstruction is removed, the boxes can travel with the chains.

From Fig. 5 it will be noted that the web 17 of each intermediate link cooperates with the mouths 14 to limit the turning movement of the links relatively to one another. In other words, a chain made up of such links may travel about a vertically arranged sprocket or may turn a corner, but no link is free to turn a complete revolution relatively to the length of the chain.

From the foregoing it is believed that the construction, operation and advantages of the invention may be readily understood by those skilled in the art, and it is apparent that changes may be made in the details disclosed, without departing from the spirit of the invention, as expressed in the claims.

What is claimed and desired to be secured by Letters Patent is:

1. A conveyer chain comprising first and second links, each of the first links being of channel shape lengthwise and having side walls, said walls forming pockets in the end portions of each link, each of the second links including balls engaging a pair of pockets of adjacent first links, and a web joining the balls, the ends of the walls of each of the first links forming mouths through which the webs extend, each of said webs and each mouth being shaped to prevent rotation of the links relatively to one another lengthwise of the chain, each of the first links having a substantially flat plate forming the bottom of the channel, and each web having a surface forming a bridge and continuation of the outer surfaces of the plates of adjacent first links.

2. A conveyer chain comprising first and second links, each of the first links being of channel shape lengthwise and having side walls, said walls forming pockets in the end portions of each link, each of the first links also having a substantially flat outer surface, each of the second links including balls engaging a pair of pockets of adjacent first links, and a web joining the balls, the ends of the walls of each of the first links forming mouths through which the webs extend, each of said webs and each mouth being shaped to prevent rotation of the links relatively to one another lengthwise of the chain, and edge of each of said webs projecting into the plane of the substantially flat surfaces of adjacent first links when the chain is lying substantially flat.

3. A conveyer chain comprising a link of channel shape lengthwise, the walls of the channel forming pockets at the ends of the links, and the ends of the walls being spaced apart to form flaring mouths, said link having a plate forming the bottom of the channel and provided with a substantially flat outer surface, and recesses in the ends of the plate communicating with said mouths.

4. A conveyer chain comprising a link of channel shape lengthwise, the walls of the channel forming pockets at the ends of the links, and the ends of the walls being spaced apart to form flaring mouths, said link having a plate forming the bottom of the channel and provided with a substantially flat outer surface, and recesses in the ends of the plate communicating with said mouths, and a second link cooperating with the first mentioned link and including a substantially flat and substantially oval-shaped web projecting into the mouth and recess and having a ball movably engaging one of said pockets.

5. A conveyer chain comprising first and second links, each of the first links being of substantially channel shape lengthwise and consisting of a plate from which projects side walls, said walls forming pockets at the ends of the first link, and the ends of the walls being spaced apart to form mouths, the ends of each plate being recessed and the recesses communicating with the mouths at the ends of the first links, each of the second links including balls engaging a pair of pockets of adjacent first links, and a web joining the balls, each web projecting through the recesses of adjacent first links to bridge the space between the plates of adjacent first links, and the webs cooperating with the mouths to prevent rotation of the links relatively to one another lengthwise of the chain.

6. A conveyer chain comprising first and second links, each of the first links being of channel shape lengthwise and having a flat web and opposite side walls, said walls forming curved pockets in the end portions of each of the first links, the edges of the ends of the side walls forming mouths, each of the second links including balls engaging a pair of pockets of adjacent first links, and a web joining the balls and extending through the mouths of the last mentioned links, the last mentioned web being of materially less width than said mouths to permit relative turning movement of the links laterally but to prevent rotation of the links relatively to one another lengthwise of the chain, each of the flat webs of the first links having recesses at their ends communicating with said mouths, and the webs of the second links being of substantially oval shape and extending into said recesses for bridging the spaces between the flat webs of the first links.

In testimony whereof, I have signed this specification.

WILLIAM R. COPPAGE.